Nov. 25, 1952   B. H. MARKS   2,619,519
MULTIPLE CAPACITOR UNIT
Filed Oct. 31, 1949

INVENTOR
BERT H. MARKS
BY
John W. Michael
ATTORNEY

Patented Nov. 25, 1952

2,619,519

UNITED STATES PATENT OFFICE 2,619,519

MULTIPLE CAPACITOR UNIT

Bert H. Marks, Milwaukee, Wis., assignor to Globe-Union Inc., Milwaukee, Wis., a corporation of Delaware Application October 31, 1949, Serial No. 124,710

2 Claims. (Cl. 175—41)

This invention relates to improvements in a capacitor unit particularly to a unit in which is incorporated a plurality of capacitors.

Plural capacitor units utilizing a ceramic base as a common dielectric have heretofore been used. In such units a common electrode is applied to one side of the base and a plurality of separated electrodes to the other side thereof. However, in many applications an undesirable capacitance coupling takes place between the separated electrodes on the same side of the plate.

It is an object of this invention, therefore, to provide a capacitor unit for providing a plurality of capacitors in which electrostatic coupling is reduced to a minimum.

Another object of the invention is to provide a unit for providing fairly large capacitances which requires comparatively small space and is simple and relatively inexpensive to manufacture.

These objects are obtained by interposing a shielding electrode between the separated electrodes and electrically connecting such shielding electrode to the common electrode. When it is desired to obtain a large capacity in a comparatively small space the unit preferably consists of separate ceramic dielectric members each of which has electrodes on opposite sides thereof. Such members are superimposed or arranged in parallel relation with the adjacent or inner electrodes electrically connected. This simple construction provides a plurality of capacitances having a common electrode which also acts as a shield between the outer or separated electrodes and reduces to a minimum the electrostatic coupling therebetween. In fact, any coupling which takes place between such separated electrodes is due only to edge effect using air (or any coating material on the unit) as the low constant dielectric and thus unwanted capacitance is reduced to such small value as to not affect the use of the unit in practical applications.

The novel features, which are considered characteristic of the invention, are set forth with particularity in the appended claims. The invention itself, however, both as to its organization and its method of operation, together with additional objects and advantages thereof, will best be understood from the following description of specific embodiments when read in connection with the accompanying drawing, in which:

Figure 1:
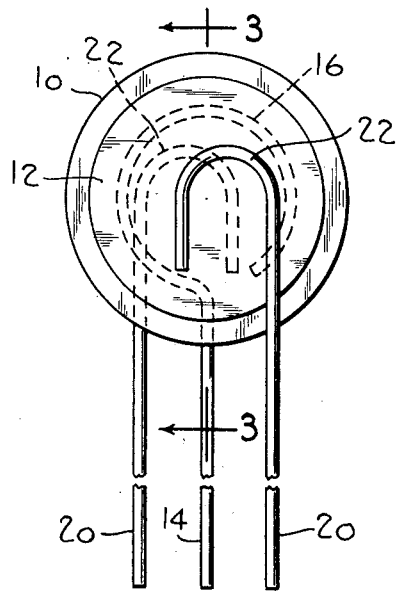
Fig. 1 is a view in front elevation of a capacitor unit embodying the present invention.
Figure 2:
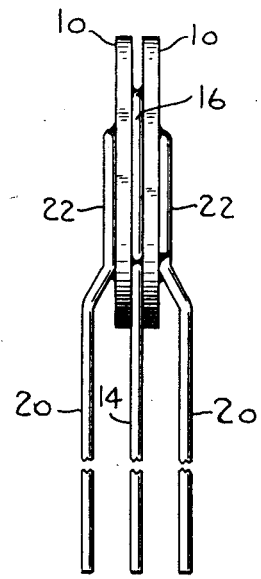
Fig. 2 is a view in side elevation of the unit of Fig. 1.
Figure 3:
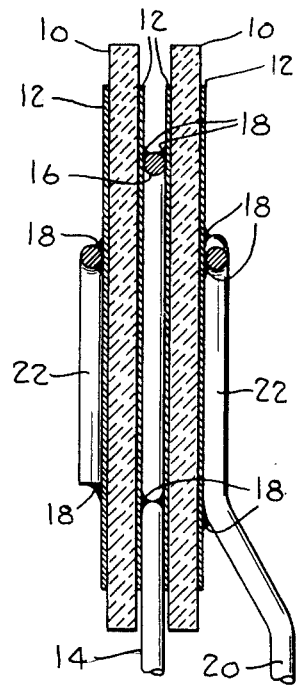
Fig. 3 is an enlarged sectional view taken on line 3—3 of Fig. 1.

Referring to the drawing by reference numerals, the modification shown in Figs. 1 to 3, inclusive, consists of a pair of ceramic dielectric disks or members 10 of substantially identical construction. These members are composed of a ceramic composition having a relatively high dielectric constant. To the opposite surfaces of each disk 10 there is applied a conductive coating 12 by a stencilled-screen process well known in this art. Such coatings form the electrodes of a capacitance using the disk as a dielectric. A pair of these disks are then superimposed or arranged in parallel position so that an electrode on one disk is adjacent an electrode on the other disk. Such electrodes are herein referred to as inner electrodes. The other electrodes on each disk are separated by the two disks and the inner electrodes and are referred to as the outer or separated electrodes. The inner electrodes are electrically connected to make a common electrode for each capacitance and also act as an electrostatic shield between the separated electrodes. One simple way of electrically connecting the inner electrodes and at the same time physically uniting the elements of the unit and providing a terminal for the inner electrode is to clamp the eye or loop portion 16 of a wire lead 14 between the two inner electrodes 12 and solder such loop to such electrodes. Such soldering is readily accomplished by the dipping method at least when the coatings and lead wire are tinned. The solder as indicated by the fillets 18 physically and electrically connects the loop 16 to both inner electrodes 12. The wire in he loop portion 16 is thick enough to space the inner electrodes sufficiently to permit molten solder to flow therebetween and engage both the surface of each inner electrode and such loop portion. Furthermore the eye of the loop portion 16 is large enough to provide stable seating for each disk and prevent relative canting thereof both before and after being joined by the solder. In many instances it may be desirable to provide the unit with outer lead wires 20. These lead wires are provided with U-shaped loops 22 which are soldered to the outer electrodes 12. All lead wires may be clamped in position and dipped as a unit into molten solder to effect the required soldering and electrically and physically connect the electrodes and the lead wires.

Figure 4:
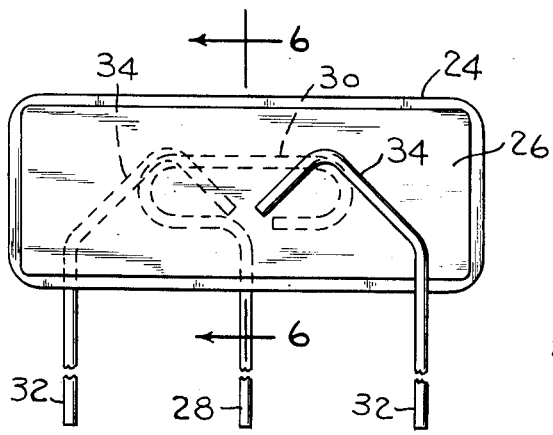
Fig. 4 is a view in front elevation of a modification of a capacitor unit embodying the present invention.
Figure 5:
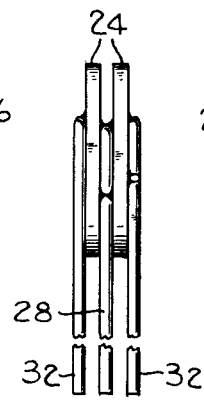
Fig. 5 is a view in side elevation of the unit of Fig. 4.
Figure 6:
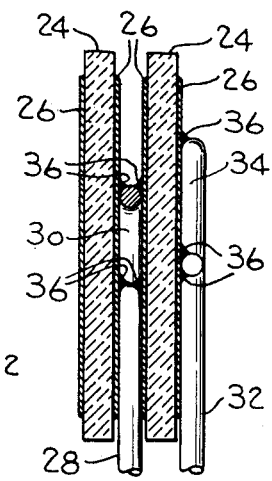
Fig. 6 is an enlarged sectional view taken on line 6—6 of Fig. 4.

In the modification shown in Figs. 4 to 6, inclusive, the ceramic dielectric members are made in the form of rectangular plates 24 and the electrodes 26 are applied to the outer surface thereof in the same manner as heretofore described for the modification of Figs. 1 to 3, inclusive. The plates 24 are superimposed or arranged in parallel relationship to provide inner and outer electrodes as in the first modification. Because of the shape of the plates 24 the inner lead wire 28 has an elongated oval-shaped loop 30 and the outer lead wires 32 have a V-shaped portion 34 to provide suitable bearing and connecting area between the electrodes and the lead wires. The wire in the loop 30 is also thick enough to space the inner electrodes sufficiently to let molten solder flow therebetween and join the loop to each electrode. The members 24 and lead wires 28 and 32 are assembled and clamped in the position shown and then dipped as a unit in the molten solder which forms fillets indicated at 36 to electrically and physically connect the electrodes 26 and the lead wires 28 and 32 and thereby hold the unit rigid.

In both modifications the outer electrodes are separated by the common electrode formed by the two connected inner electrodes. This common electrode acts as the electrode for each capacitance and as a shield for electrostatically shielding the separated or outer electrodes. Whatever electrostatic coupling occurs between the outer electrodes is limited to edge effect only and the dielectric therefor is either air or a coating which may be applied to the completed unit. In either event the dielectric constant of the air or coating is so low that any unwanted coupling is reduced to a minimum and has no effect in the commercial applications in which the unit will be utilized.

Figure 7:
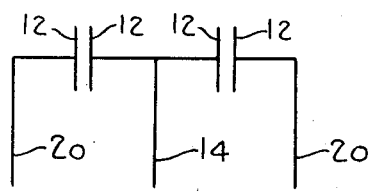
Fig. 7 is a schematic diagram of the electronic circuit of such units.

The schematic electronic circuit shown in Fig. 7 has been given the same numbers as is applied to the modification shown in Figs. 1 to 3, inclusive. The same schematic diagram applies, however, to the modification of Figs. 4 to 6, inclusive.

Although only several embodiments of the invention are shown and described herein, it will be understood that this application is intended to cover such other changes or modifications as come within the spirit of the invention or scope of the following claims.

I claim:

1. A three lead dual capacitor unit comprising a pair of rectangular-shaped ceramic plates having a relatively high dielectric constant, a silver composition electrode applied to opposite surfaces of said plates to form a capacitance, said plates being superimposed to provide adjacent inner electrodes and separated outer electrodes, an inner lead conductor having an elongated loop inserted between said inner electrodes, said conductor being thick enough to space said inner electrodes sufficiently to let molten solder flow therebetween, said loop being wide enough to form a suitable bearing for said inner electrodes and plates, a solder connection between said loop and said electrodes to physically and electrically connect said inner electrodes to make said unit rigid and its components fixed and to provide an electrostatic shield between said outer electrodes to reduce coupling therebetween, and a lead for each of said outer electrodes having a soldered connection thereto whereby each capacitance may be separately connected in different electric circuits.

2. A plural capacitor unit having leads for separately electrically connecting each capacitor in said unit in a selected circuit comprising a plurality of ceramic dielectric members stacked side by side, each member having electrodes bonded to opposite sides thereof to form separate capacitors, a lead for electrically connecting said capacitors in selected circuits placed between adjacent members and extending laterally of said unit, said lead having portions between inner ones of said electrodes sufficiently spaced to provide a suitable bearing for adjacent members, said portions being thick enough to space said inner ones of said electrodes sufficiently to let molten solder flow therebetween, said portion being physically and electrically connected to the adjacent electrodes of said members to hold said members assembled as a unit, and a separate lead for separately electrically connecting said capacitors of said unit in a selected circuit secured to each electrode of said members opposite said adjacent electrodes and extending laterally of said unit whereby any two adjacent leads may be used to separately electrically connect a single capacitor of said unit in a selected circuit.

BERT H. MARKS.

REFERENCES CITED

The following references are of record in the file of this patent:

UNITED STATES PATENTS

| Number | Name | Date |
|---|---|---|
| 1,049,940 | Streichert | Jan. 7, 1918 |
| 1,255,597 | Giles | Feb. 5, 1918 |
| 2,065,921 | Gerth | Dec. 29, 1936 |
| 2,161,888 | Rearick | June 13, 1939 |
| 2,224,288 | Chapman | Dec. 10, 1940 |
| 2,398,088 | Ehlers | Apr. 9, 1946 |
| 2,421,047 | Wolfson | May 27, 1947 |
| 2,437,212 | Schottland | Mar. 2, 1948 |
| 2,476,455 | Roush | July 19, 1949 |
| 2,527,373 | Parson | Oct. 24, 1950 |
| 2,547,085 | Mazzola | Apr. 3, 1951 |

FOREIGN PATENTS

| Number | Country | Date |
|---|---|---|
| 440,951 | Great Britain | Jan. 6, 1936 |